United States Patent
Robinson et al.

(10) Patent No.: US 11,131,742 B2
(45) Date of Patent: *Sep. 28, 2021

(54) RECONFIGURABLE ANALOG-TO-DIGITAL CONVERSION SAMPLING OF ANTENNAS FOR PHASE INTERFEROMETRY

(71) Applicant: Raytheon Company, Waltham, MA (US)

(72) Inventors: Ian S. Robinson, Redondo Beach, CA (US); Bradley Flanders, Whittier, CA (US)

(73) Assignee: Raytheon Company, Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/528,136

(22) Filed: Jul. 31, 2019

(65) Prior Publication Data

US 2019/0353743 A1    Nov. 21, 2019

Related U.S. Application Data

(63) Continuation of application No. 15/406,493, filed on Jan. 13, 2017, now Pat. No. 10,502,809.

(51) Int. Cl.
| | | |
|---|---|---|
| *G01S 13/04* | (2006.01) | |
| *G01S 3/48* | (2006.01) | |
| *G01S 7/02* | (2006.01) | |
| *G01S 3/04* | (2006.01) | |

(52) U.S. Cl.
CPC ........... *G01S 3/48* (2013.01); *G01S 3/043* (2013.01); *G01S 7/021* (2013.01)

(58) Field of Classification Search
CPC ............ G01S 3/043; G01S 3/48; G01S 7/021
See application file for complete search history.

(56) References Cited

U.S. PATENT DOCUMENTS

| | | | |
|---|---|---|---|
| 7,477,192 B1* | 1/2009 | Haff | G01S 3/30 |
| | | | 342/374 |
| 9,134,409 B2* | 9/2015 | Mizutani | G01S 13/06 |
| 9,571,119 B2 | 2/2017 | Flanders et al. | |
| 10,502,809 B2* | 12/2019 | Robinson | G01S 3/043 |
| 2015/0072633 A1* | 3/2015 | Massarella | G01S 7/021 |
| | | | 455/214 |
| 2016/0049950 A1 | 2/2016 | Flanders et al. | |
| 2016/0302146 A1* | 10/2016 | Rangan | H04W 52/0209 |
| 2016/0337677 A1 | 11/2016 | Lee | |

* cited by examiner

*Primary Examiner* — Timothy A Brainard (57) ABSTRACT

A system is provided that includes multiple analog-to-digital converters (ADCs), multiple antennas, and one or more processors. The one or more processors are configured, in a first mode of operation, to receive from the multiple ADCs samples of emissions received by one of the antennas and identify a signal of interest. The one or more processors are configured, in a second mode of operation, receive from the multiple ADCs samples of emissions received by the multiple antennas and identify an angle of arrival for the signal of interest.

20 Claims, 7 Drawing Sheets

RECONFIGURABLE ANALOG-TO-DIGITAL CONVERSION SAMPLING OF ANTENNAS FOR PHASE INTERFEROMETRY

CROSS-REFERENCE TO RELATED APPLICATION AND PRIORITY CLAIM

This application claims priority under 35 U.S.C. § 120 as a continuation of U.S. patent application Ser. No. 15/406,493 filed on Jan. 13, 2017, which is hereby incorporated by reference in its entirety.

TECHNICAL FIELD

The present disclosure is directed in general to phase interferometry angle of arrival determination and more particularly to accurate and rapid angle of arrival determination over very wide instantaneous bandwidths.

BACKGROUND OF THE DISCLOSURE

Multiple antennas and associated receivers are often used to detect and determine the angle of arrival (AoA) of an E signal (e.g., electromagnetic radiation such as radar). A difficulty arises in quickly and accurately determining AoA over the entire spectrum of different signals of interest, especially radar, for which the highest frequency of interest is typically at least nine times (9×) the lowest frequency. Similar difficulties may arise in connection with AoA determination in other situations.

SUMMARY OF THE DISCLOSURE

In a first embodiment, a method for operating a system that includes multiple analog-to-digital converters (ADCs) and multiple antennas is provided. The method includes, in a first mode of operation, using the multiple ADCs to sample emissions received by one of the antennas and identifying a signal of interest. The method also includes, in a second mode of operation, using the multiple ADCs to sample emissions received by the multiple antennas and identifying an angle of arrival for the signal of interest.

In a second embodiment, an apparatus for use in a system having multiple ADCs and multiple antennas is provided. The apparatus includes one or more processors configured, in a first mode of operation, to receive from the multiple ADCs samples of emissions received by one of the antennas and identify a signal of interest. The one or more processors are also configured, in a second mode of operation, to receive from the multiple ADCs samples of emissions received by the multiple antennas and identify an angle of arrival for the signal of interest.

In a third embodiment, a system is provided that includes multiple ADCs, multiple antennas, and one or more processors. The one or more processors are configured, in a first mode of operation, to receive from the multiple ADCs samples of emissions received by one of the antennas and identify a signal of interest. The one or more processors are configured, in a second mode of operation, receive from the multiple ADCs samples of emissions received by the multiple antennas and identify an angle of arrival for the signal of interest.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Detection of electromagnetic signals and determination of accurate angle of arrival (AoA) for those signals anywhere within a very wide instantaneous bandwidth while simultaneously minimizing the total size, weight, power and cost (SWaP-C) at each antenna station is difficult, particularly for electronic warfare (EW) systems and especially for interferometer arrays. New threats require electronic support (ES) and radar warning receiver (RWR) systems to capture very wide instantaneous bandwidths, especially for frequency agile emitters. Total SWaP-C is driven, in part, by total data rate and required analog-to-digital converter (ADC) sample rate.

Some approaches to AoA determination could involve performing interferometry over segments of spectrum—for example, 2-6 Giga-Hertz (GHz) or 6-18 GHz. However, limiting spectrum scanning to limited bands in order to intercept signals of interest will have decreasing success against future agile threats. In these approaches, when signals of interest are detected, multiple (N) receivers/antennas are all cued to the frequency of the detected signal to measure AoA. Such a system cannot receive new or hopped signals across the spectrum while measuring AoA. Other approaches to the problem would receive the full spectrum of interest, but require N times the data rate, and thus N times the power for data conversion and input/output (I/O) compared to the present disclosure. Power is very limited at many antenna stations, as is the ability to manage waste heat, and it is desirable to reduce or minimize the power consumed and heat generated at such stations. Further, use of segmented spectral regions may involve using specific antenna spacing patterns for each segment.

A typical phase interferometry system may use 4-6 antennas that are scanned in frequency to cover the spectrum of interest and that collectively perform direction-finding (DF) when one of the antennas finds a signal of interest. The channels for each antenna receive path may be tuned independently over bands encompassing hundreds of MHz or even more than a GHz, but still sense only a small portion of the spectrum of interest at any one time. Down converters within the antenna receive paths contain filter banks that parse the spectrum into bands, and precision angle of arrival determination by interferometry is performed with the antennas tuned to a common spectral band. When performing angle of arrival determination, only one portion of the entire spectrum of interest is sensed, such that agile signals can escape or new signals illuminating the aircraft are not detected.

In the approach of the present disclosure, receivers are reused in different combinations for very wideband detection and for direction finding over a wideband spectrum. The resulting data collection and phase interferometer AoA system reduces SWaP-C and includes N antennas deployed with N ADCs that can be configured in two modes: a first mode in which all ADCs are connected to a corresponding one antenna to detect all signals of interest, with the ADCs each operating at 1/N of the Nyquist frequency but interleaved to provide Nyquist sampling of the full spectrum; and a second mode in which each receiver and ADC is connected to one of the N antennas arranged as an interferometer to direction-find signals, while still detecting signals across the full spectrum to provide coverage of "pop ups" or changes in emitter frequency. In the second mode, the same ADCs are used with a different sampling rate than in the first mode, possibly without any filters between the respective antennas and each ADC. In the second mode, each ADC is sampled without aliasing using either bandpass sampling or non-uniform under-sampling. Signals are detected at each frequency of interest (initially selected from those detected when operating in the first mode) to continue to track known signals. The phase for each detected signal of interest at each antenna is computed from the bandpass of non-uniformly spaced samples to measure AoA using interferometry. Alternatively, if the signals detected in the first mode are not at the same frequency in the second mode (e.g., the signal has "hopped" in frequency, the samples from N antennas can be tested individually or in combination to detect and direction-find new or agile emitters. Overall, the approach provides wideband coverage for detection and AoA determination, plus direction-finding via interferometry with a low data/sample rate.

Figure 1:
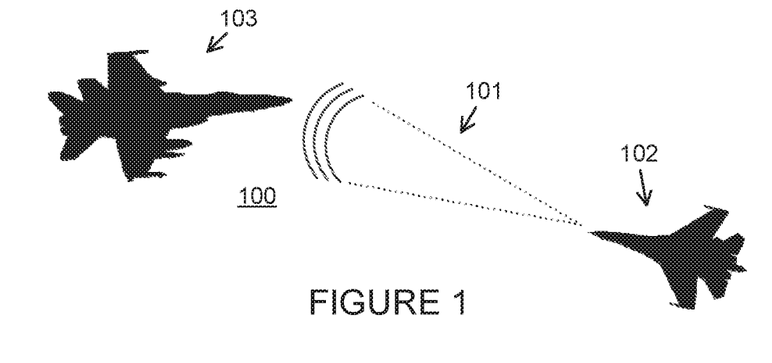
FIG. 1 is a diagram illustrating an environment within which phase interferometry angle of arrival detection may be performed in accordance with one embodiment of the present disclosure.

FIG. 1 is a diagram illustrating an environment within which phase interferometry angle of arrival detection may be performed in accordance with one embodiment of the present disclosure. Those skilled in the art will recognize that, for simplicity and clarity, some features and components are not explicitly shown, including those illustrated in connection with later figures. In the exemplary environment 100 of FIG. 1, signals 101 are transmitted by a transmitter system on a first aircraft 102 toward a second aircraft 103. An antenna array (not shown in FIG. 1) on aircraft 103 (or, alternatively, on a land-based installation) is configured to determine the AoA of the signals 101 using phase interferometry operating in the manner described below.

Figure 2A:
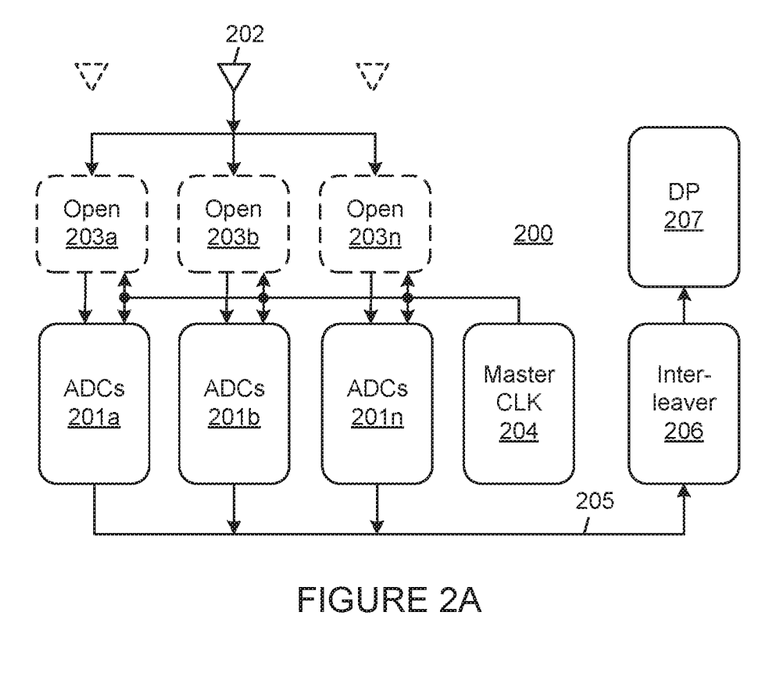
FIGS. 2A-2C are diagrams of a phase interferometry radar warning receiver in accordance with embodiments of the present disclosure.
Figure 2B:
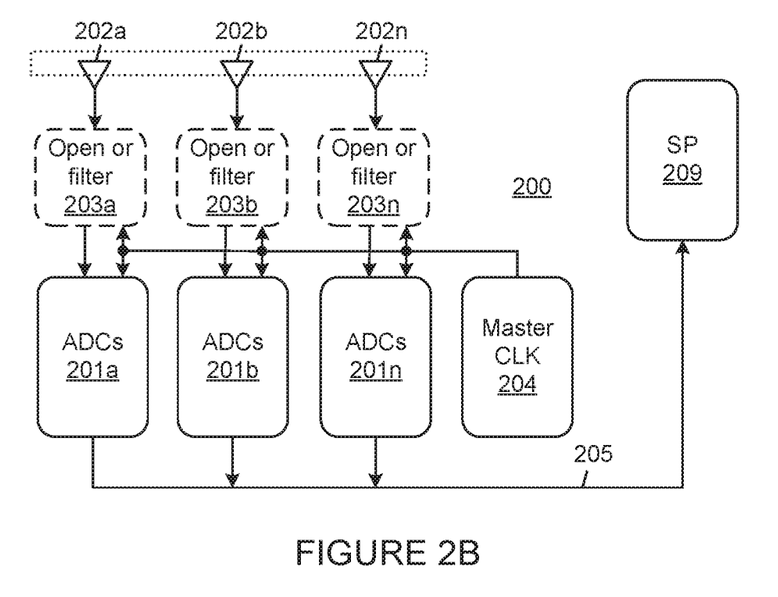
Figure 2C:
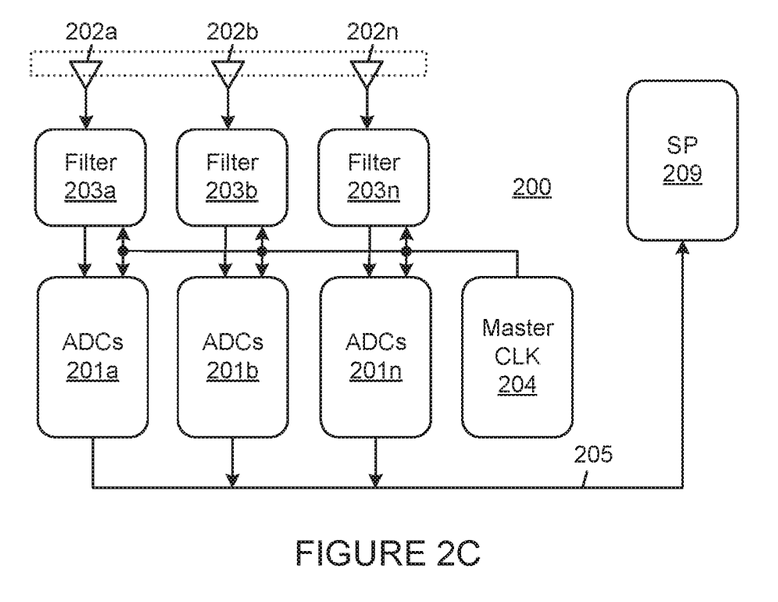

FIGS. 2A-2C are diagrams of a phase interferometry receiver in accordance with embodiments of the present disclosure. The exemplary systems illustrated are used on and in an aircraft 103 to determine the AoA of radar signals, although other applications will be apparent to those skilled in the art. Once again, those skilled in the art will recognize that, for simplicity and clarity, some features and components are not explicitly shown. FIG. 2A illustrates the phase interferometry radar warning receiver 200 configured to operate in a first mode. Each of N ADCs 201a-201n receives and samples a radio frequency signal from a single antenna 202 within an array of 3-5 antennas. Each ADC 201a-201n runs as slow as 1/N of the Nyquist sampling rate (but may optionally run faster), but sample times of the ADCs 201a-201n are interleaved by 1/Nth of a sample period such that the composite sampling is at the Nyquist rate over a widest possible band, covering the full spectrum of interest. Signals may be detected across the full spectrum of interest. Filters 203a-203n within an optional filter bank are all in an open position in this mode of operation (although, alternatively, they may be in a non-open position).

Each of the ADCs 201a-201n (and each of the filters 203a-203n, if present and operative) is coupled to a master clock generator 204 controlling the timing of sampling by the ADCs 201a-201n. Each of the ADCs 201a-201n is also coupled to a high speed sensor and processor data network 205, and further connected by the network 205 to an interleaver 206. The interleaver 206 arranges the samples received from ADCs 201a-201n according to a predetermined interleave pattern and forwards the resulting data to data processing module(s) 207, which comprise one or more processors (central processing units or "CPUs") and associated memory. The data processing modules(s) 207 identify signals of interest within the outputs of ADCs 201a-201n.

FIG. 2B illustrates the phase interferometry radar warning receiver 200 configured to operate in a second mode. The general structure of the antennas and ADCs is the same, except that only one of the N ADCs 201a-201n operates on signals from each of N antennas 202a-202n (which other systems use to scan the spectrum) in order to perform direction finding. Each ADC is under-sampled using, for example, non-uniform under-sampling techniques disclosed in U.S. Patent Application Publication No. 2016/0049950 entitled "DEFEAT OF ALIASING BY INCREMENTAL SAMPLING," the content of which is incorporated herein by reference. Alternatively, other under-sampling techniques may be used. The optional filters 203a-203n may be open or may limit the signal passed to ADCs 201a-201n to selected spectrum. All ADCs 201a-201n sample their respective signals simultaneously. The outputs of ADCs 201a-201n are routed to bypass the interleaver 206 and provide N data streams to signal processing modules 209 performing phase interferometry to find the AoA of the signal of interest. Processing modules 207 and processing modules 209 may share common circuitry. The received spectrum is also concurrently tested for arrival of new signals so agile or pop-up signal emitters are not missed.

FIG. 2C illustrates the phase interferometry receiver 200 configured to operate in the second mode in embodiments using bandpass sampling. This embodiment operates as described above for the embodiment of FIG. 2B except that the filters 203a-203n (which are optional in other embodiments) are configured to enable ADCs 201a-201n to bandpass sample the signal from each antenna using a clock rate of about 1/N. If the full spectrum is 1-18 GHz, a single ADC would need to sample signals above 36 Giga-samples per second to avoid aliasing, with 30 Gsamp/sec being typical. In an example of the present disclosure, where, for example, N=4, then the sample rate will be 10 Gsamp/sec or less for any filter setting. Instantaneous frequency coverage for such an example is shown in TABLE I below.

Figure 3:
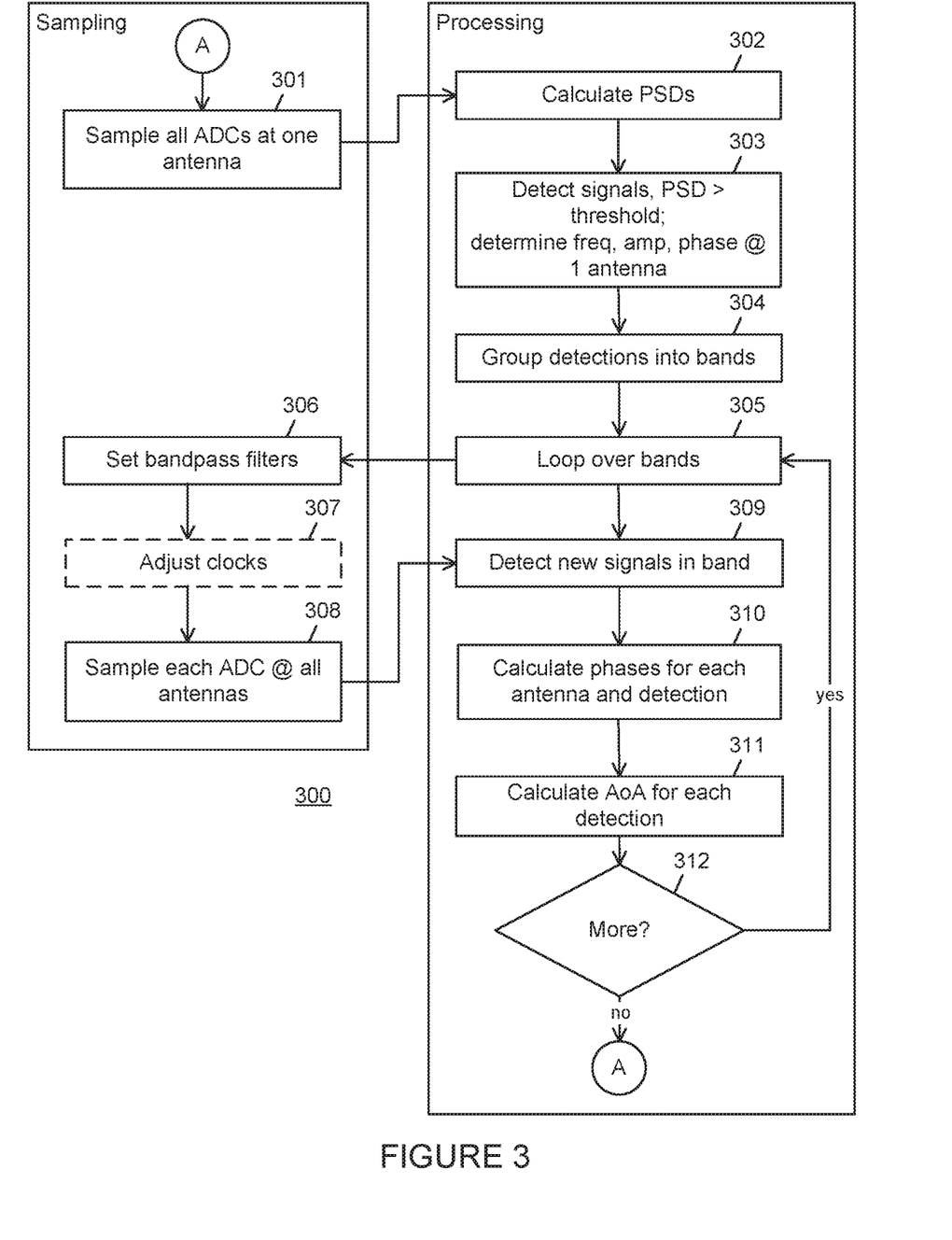
FIG. 3 is a high level flow diagram for phase interferometry radar signal angle of arrival (AoA) determination using bandpass sampling in accordance with embodiments of the present disclosure.

FIG. 3 is a high level flow diagram for phase interferometry radar signal angle of arrival determination using bandpass sampling in accordance with embodiments of the present disclosure. The process described is implemented by a phase interferometry receiver of the type illustrated by FIGS. 2A and 2C. Although depicted as a series of steps, unless explicitly stated or inherently required (e.g., a signal cannot be processed before being received), no implication is intended regarding the ability to perform some portions of the process concurrently or in a parallel or pipelined manner or regarding the particular order of performance.

The process 300 begins with the ADCs 201a-201n configured to all sample a single antenna 202 (step 301), at different, interleaved times such that the full spectrum of interest is Nyquist sampled as discussed above. The ADCs 201a-201n provide digital representations of the received emissions (if any) at the respective times. The digital data is received by a data processor 207 that calculates power spectral densities (PSDs) for each frequency within the spectrum of interest for all received emissions (step 302). For uniformly sampled data, PSDs are typically calculated by a Fast Fourier Transform (FFT) of the time series signal samples. For non-uniformly sampled data, other techniques are disclosed in the incorporated U.S. Patent Application Publication No. 2016/0049950 entitled "DEFEAT OF ALIASING BY INCREMENTAL SAMPLING," and described in other references related to non-uniform sampling. Based on the PSDs, signals having a signal power greater than (or equal to or greater than) a defined threshold are detected and identified, with the frequency, amplitude and phase at the single antenna 202 determined for each detected signal within the received radar emissions (step 303). Alternatively, the signals may be channelized (e.g., passed through a polyphaser digital channelizer) and the outputs of each channel tested versus a predetermined detection threshold.

The processing then loops over the bands (step 305) to which the full spectrum of interest has been divided. In the example of FIG. 3, bandpass filters 203a-203n are set (step 306). Optionally, clock timing within the ADCs 201a-201n relative to the signal from master clock 204 is adjusted (step 307). Each ADC 201a-201n is sampled using radar emissions received on all antennas 202a-202n (step 308). The resulting information is used to assist in detecting any new signals within a band being processed by, for example, SP 209 (step 309). Phases for each detected signal, both previously detected signals and newly detected signals, at each antenna 202a-202n are calculated (step 310), and AoA is calculated for each detection (step 311). Once AoA is determined or the signal is determined to have terminated, the process repeats with step 301. Otherwise other processing may be performed, or the process described may be restarted from the beginning.

As an example of bandpass sampling, a system covering frequencies from 2-18 GHz may employ ADCs that are interleaved in the first mode. In the second mode, all antennas are configured to use one of the following filters and clocks:

TABLE I

| Filter | Clock |
|---|---|
| 2-3.9 GHz | 8 G-samples/sec |
| 3.7-7 GHz | 7.2 G-samples/sec |
| 5.5-9 GHz | 9.2 G-samples/sec |
| 8-11.9 GHz | 7.95 G-samples/sec |
| 11-14.5 GHz | 10 G-samples/sec |
| 14-18 GHz | 9.2 G-samples/sec |

The sample frequency $F_S$ relative to the low and high frequencies $f_L$, $f_H$ and an integer k will be:

$$\frac{2f_H}{k} \leq F_S \leq \frac{2f_L}{k-1}.$$

The parameters may be summarized as follows:

TABLE II

| $f_L$ | $f_H$ | k | $<F_S$ | $F_S$ | $>F_S$ |
|---|---|---|---|---|---|
| 2 | 3.9 | 1 | 7.8 | 8 | — |
| 3.7 | 7 | 2 | 7 | 7.2 | 7.4 |
| 5.5 | 9 | 2 | 9 | 9.2 | 11 |
| 8 | 11.9 | 3 | 7.933333 | 7.95 | 8 |
| 11 | 14.5 | 3 | 9.666667 | 10 | 11 |
| 14 | 18 | 4 | 9 | 9.2 | 9.333333 |

Figure 4:
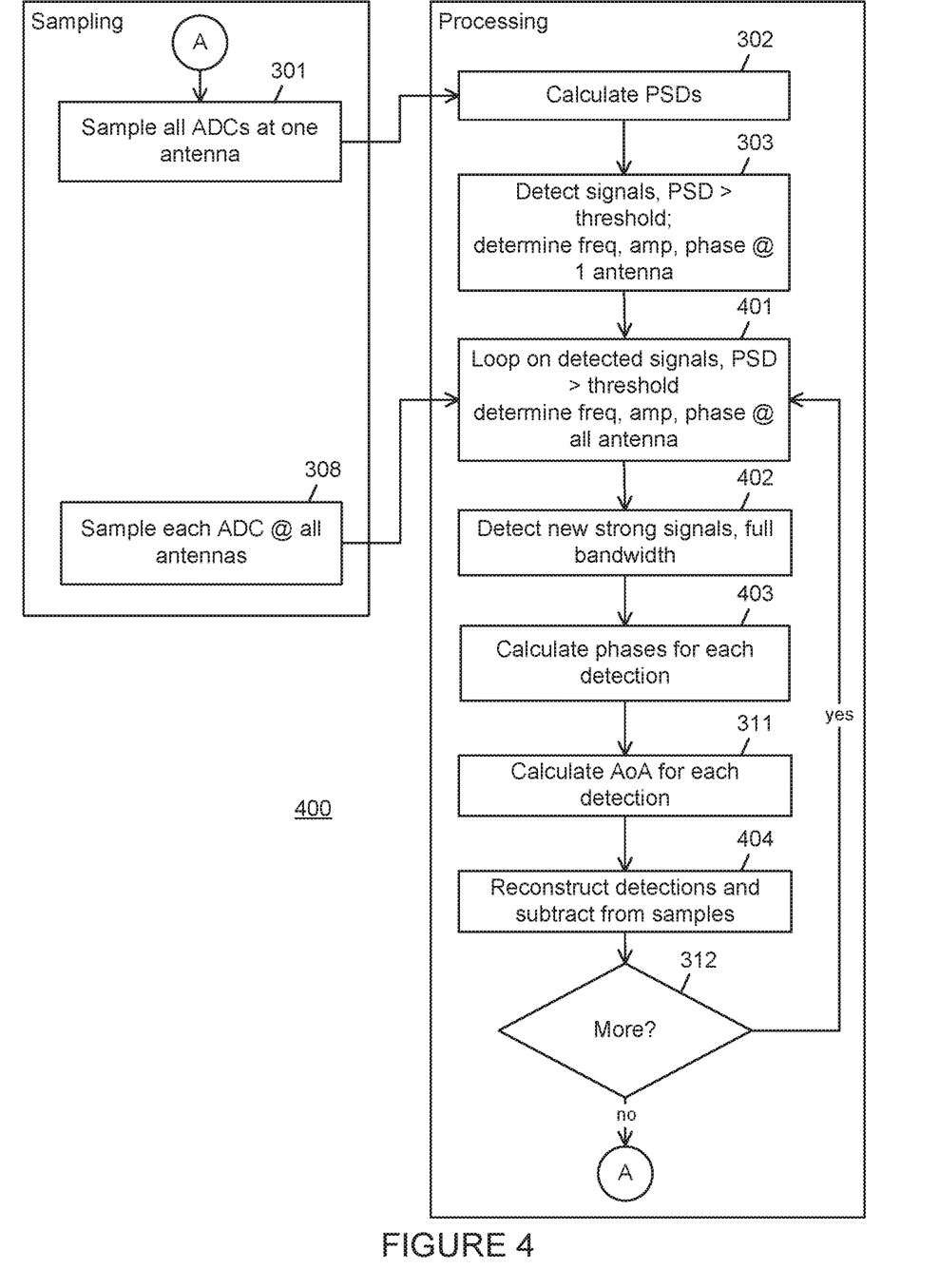
FIG. 4 is a high level flow diagram for phase interferometry radar signal angle of arrival determination using under-sampling in accordance with embodiments of the present disclosure.

FIG. 4 is a high level flow diagram for phase interferometry radar signal angle of arrival determination using non-uniform under-sampling in accordance with embodiments of the present disclosure. The process 400 is a counterpart to the process 300 in FIG. 3, and shares the process steps identified by like reference characters while eliminating those process steps not depicted in FIG. 4. As with the process in FIG. 3, the process depicted in FIG. 4 is implemented by a phase interferometry radar warning receiver of the type illustrated by FIGS. 2A and 2B. Again, although depicted as a series of steps, unless explicitly stated or inherently required (e.g., a signal cannot be processed before being received), no implication is intended regarding the ability to perform some portions of the process concurrently or in a parallel or pipelined manner or regarding the particular order of performance.

The process 400 begins with the ADCs 201a-201n configured to all sample a single antenna 202 (step 301) at a sub-Nyquist rate with interleaved time samples, such that the N ADCs combined provide Nyquist sampling, covering the full spectrum of interest as discussed above. The ADCs 201a-201n provide digital representations of the received radar emissions (if any) in the respective frequency bands. The digital data is received by a data processor 207 that calculates PSDs within any received emissions (step 302). PSDs are calculated as described above. Based on the PSDs, signals having PSD greater than (or equal to or greater than) a defined threshold are detected and identified, with the frequency, amplitude and phase at the single antenna 202 determined for each detected signal within the received radar emissions (step 303).

In the example of FIG. 4, the sampling of each ADC 201a-201n at all antennas 202a-202n (step 308) is not preceded by setting bandpass filters. In the first mode of operation, the receiver determines frequency and amplitude of signals with power greater than the threshold. In a second mode of operation, one ADC is connected to each antenna, and the ADCs are non-uniformly under-sampled. An initial test is made to confirm the presence of the frequencies detected in the first mode of operation. For any signals detected at these frequencies, the amplitude and phase are determined at each antenna (step 401). Optionally, additional frequencies may be tested for the presence of new signals within the full bandwidth of the spectrum of interest (step 402). If such signals are detected, the phases are computed for the new signals from each antenna (step 403). Following calculation of AoA for each signal detection (step 311), optionally the time series of the detected signals are reconstructed and subtracted from the measured samples (step 404). If total power of the remaining samples is above a pre-defined threshold, then the process returns to loop through to look at or for weaker signals (step 401). Otherwise other processing may be performed, or the process described may be restarted from the beginning.

Figure 5A:
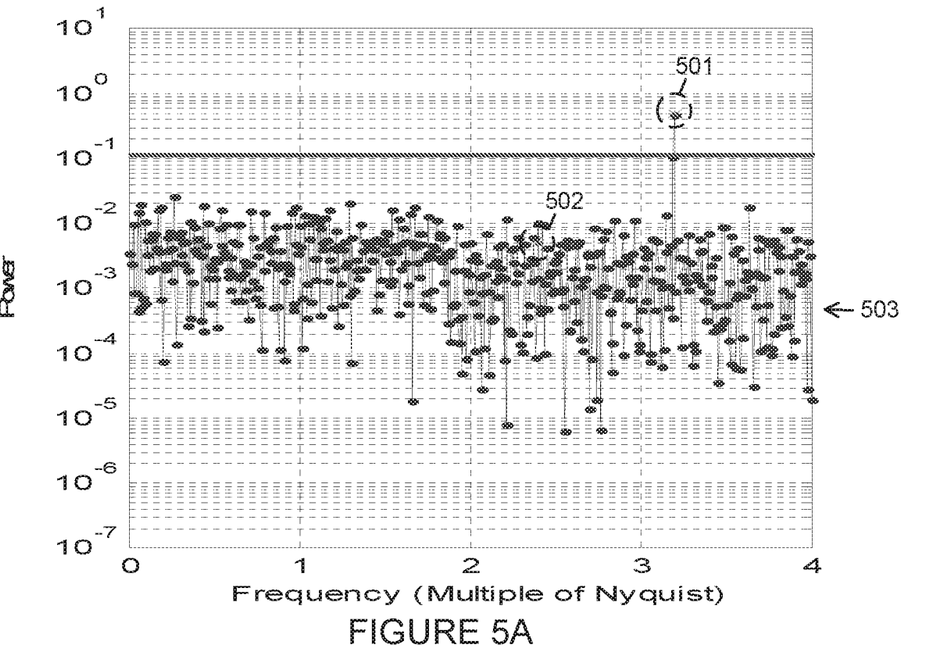
FIGS. 5A and 5B illustrate an example of the PSD resulting from non-uniform under-sampling in accordance with embodiments of the present disclosure.
Figure 5B:
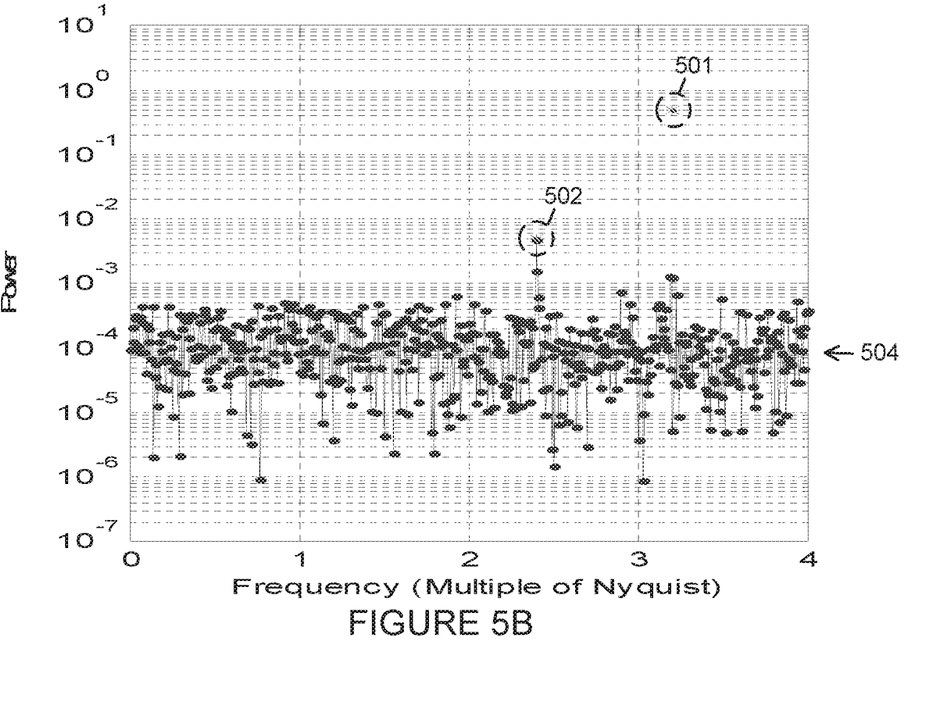

FIGS. 5A and 5B illustrate an example of the PSD resulting from non-uniform under-sampling in accordance with embodiments of the present disclosure. Two signals are present in the test data, both single frequency tones depicted by the two asterisks (circled in dashed lines) 501 and 502 in FIGS. 5A and 5B. The strong signal dominating the initial PSD 503 (depicted as oval data points connected by lines) in FIG. 5A must be removed before detecting the weak signal that can be seen in FIG. 5B. This occurs because non-uniform sampling causes the PSD to have additional background structure at other frequencies than the true frequency. Thus the portion of the background 502 caused by the strong signal 501 at 3.2 times the Nyquist frequency is stronger than the weak signal 502 at 2.4 times Nyquist. After the time series of the strong signal 501 is reconstructed and subtracted from the samples, a PSD 504 (also depicted as oval data points connected by lines) of the resulting residual data, shown in FIG. 5B, will allow detection of the weaker signal 502 at 2.4 Nyquist from this residual data.

Figure 5C:
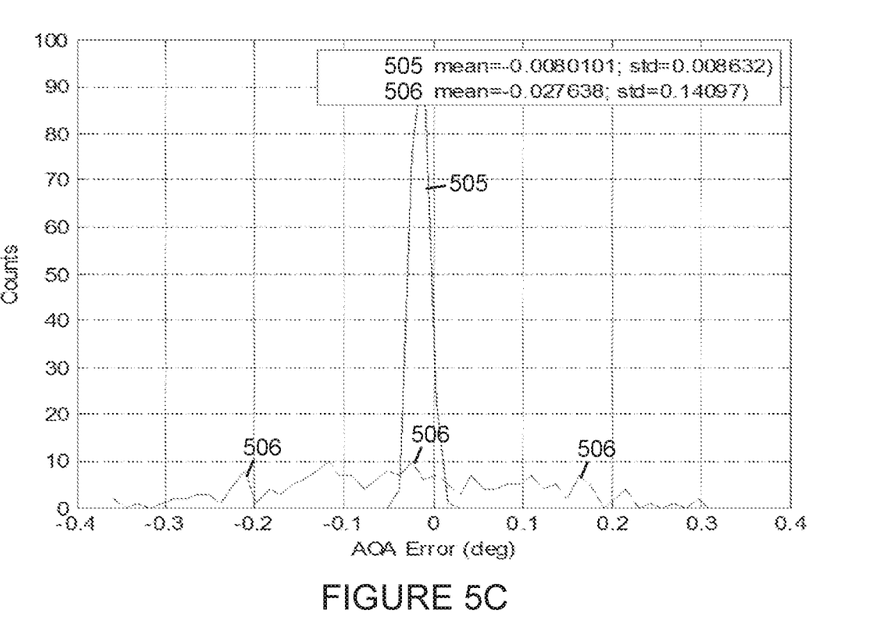
FIGS. 5C-5E show AoA error distributions for three different modes of operation in accordance with embodiments of the present disclosure.
Figure 5D:
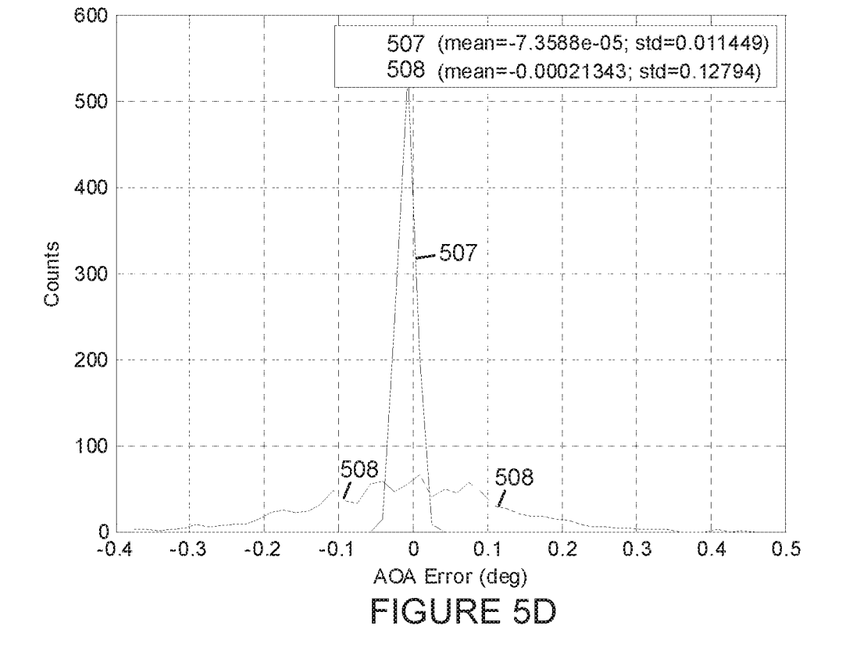
Figure 5E:
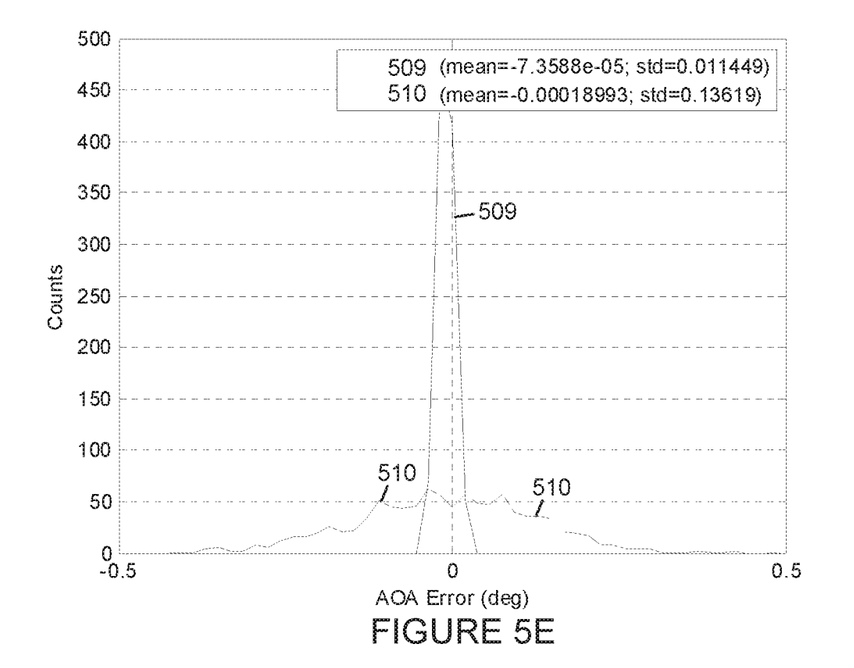

Phase interferometry is a well understood process converting the measured phases at each antenna to the correct AoA. Noise causes errors in the retrieved AoA where the retrieved AoA is close to truth. In some cases, the noise is so high that one or more retrieved phases have an error greater than $2\pi$. When the phase error is larger than $2\pi$, the AoA error can be very large. FIGS. 5C-5E show AoA error distributions for three different modes of operation. FIG. 5C characterizes the performance of the bandpass sampled mode, which does not have the high background structure in the PSD, and therefore does not require removal of the strong signal 505 before determining the phase and AoA of the weak signal 506. In the AoA error distribution for each signal without efforts at removal, shown in FIG. 5C, the strong signal 505 is more accurately measured than the weak signal 506, with respective errors of 0.01° versus 0.14°. The AoA error distribution using the non-uniformly under-sampled mode after strong signal 507, 509 removal before determining the phase and AoA of the weak signal 508, 510 is illustrated in FIGS. 5D and 5E, which respectively depict cued removal and blind removal. Cued removal uses the first mode Nyquist sampling to assist the strong signal removal; blind removal relies solely on the N non-uniformly under-sampled ADCs to characterize and remove the strong signal. In the case of these pure tones, as in FIGS. 5A-5B; results are very similar. A small number of pulses have phase errors that cross $2\pi$, giving large AoA errors. These pulses are filtered from the distributions.

In variants of the second mode of operation, the results of operating in the first, first mode may be used to provide a frequency cue or a prediction of the signal on which to perform direction-finding after the switch to the second, second mode. Alternatively, a radio frequency (RF) filter may be employed. Phase interferometry may then be performed on selected cued signals or all detected signals, or on an operator selectable one of the two. In this variant, the ability to test for new or agile emitters is limited to the bandpass selected. As another variant, in the non-uniformly under-sampled embodiments, the full spectrum of interest may be received. Detection and removal of the strongest signals is required in order to look for weaker signals, for example by using approaches described in the above-referenced patent application publication. Those approaches are able to find the phase and amplitude of signals. As a result, the ability to test for new or agile emitters extends across the full spectrum, although the ability to detect weak signals may be limited by the accuracy of strong signal removal.

In still other variants, in the first mode of operation, an ADC is connected to each antenna, where a different RF filter is employed between each antenna and its respective ADC. The sampling clock for each ADC is tuned so that the ADC provides unaliased data from bandpass sampling.

As described above, the non-uniformly under-sampled embodiment for the second operating mode has been tested where each receiver works alone to detect and remove strong signals. The non-uniformly under-sampled embodiment for the second operating mode has also been tested where all receivers work together to jointly detect and remove strong signals. In any embodiment, fixed filters may be replaced with tunable filters.

The first mode determines if a signal is agile or not, and may therefore adjust the clocks of uniform under-sampling to avoid aliasing. There are also variants of bandpass sampling with two distinct clocks only.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. A method for operating a system that includes multiple analog-to-digital converters (ADCs) and multiple antennas, the method comprising:

in a first mode of operation, receiving emissions by one of the multiple antennas, using the multiple ADCs to sample the emissions received by the one of the multiple antennas, and identifying a signal of interest; and in a second mode of operation, receiving emissions by the multiple antennas, using the multiple ADCs to sample the emissions received by the multiple antennas, and identifying an angle of arrival for the signal of interest.

2. The method of claim 1, wherein sample times of the multiple ADCs are interleaved in the first mode of operation.

3. The method of claim 1, wherein the multiple ADCs perform bandpass sampling or non-uniform under-sampling in the second mode of operation.

4. The method of claim 1, wherein a sampling rate of the multiple ADCs in the first mode of operation differs from the sampling rate of the multiple ADCs in the second mode of operation.

5. The method of claim 1, wherein phase interferometry is used to identify the angle of arrival for the signal of interest.

6. The method of claim 1, wherein the first and second modes of operation enable reuse of the multiple antennas and the multiple ADCs to support signal detection and direction-finding over a wideband spectrum.

7. The method of claim 1, wherein, in the first mode of operation:
outputs of the multiple ADCs are used to identify at least one power spectral density for frequencies within a spectrum of interest; and
the signal of interest is identified using the at least one power spectral density.

8. An apparatus comprising:
multiple antennas; and
one or more processors configured to:
in a first mode of operation, receive from multiple analog-to-digital converters (ADCs) samples of emissions received by one of the multiple antennas and identify a signal of interest; and
in a second mode of operation, receive from the multiple ADCs samples of emissions received by the multiple antennas and identify an angle of arrival for the signal of interest.

9. The apparatus of claim 8, wherein the one or more processors are configured to receive interleaved samples of the emissions received by the one of the multiple antennas in the first mode of operation.

10. The apparatus of claim 8, wherein the one or more processors are configured to receive samples obtained using bandpass sampling or non-uniform under-sampling in the second mode of operation.

11. The apparatus of claim 8, wherein the one or more processors are configured such that a sampling rate of the multiple ADCs in the first mode of operation differs from the sampling rate of the multiple ADCs in the second mode of operation.

12. The apparatus of claim 8, wherein the one or more processors are configured to use phase interferometry to identify the angle of arrival for the signal of interest.

13. The apparatus of claim 8, wherein the first and second modes of operation enable reuse of the multiple antennas and the multiple ADCs to support signal detection and direction-finding over a wideband spectrum.

14. The apparatus of claim 8, wherein, in the first mode of operation, the one or more processors are configured to:
use outputs of the multiple ADCs to identify at least one power spectral density for frequencies within a spectrum of interest; and
identify the signal of interest using the at least one power spectral density.

15. A system comprising:
multiple analog-to-digital converters (ADCs);
multiple antennas; and
one or more processors configured to:
in a first mode of operation, receive from the multiple ADCs samples of emissions received by one of the multiple antennas and identify a signal of interest; and
in a second mode of operation, receive from the multiple ADCs samples of emissions received by the multiple antennas and identify an angle of arrival for the signal of interest.

16. The system of claim 15, wherein sample times of the multiple ADCs are interleaved in the first mode of operation.

17. The system of claim 15, wherein the multiple ADCs are configured to perform bandpass sampling or non-uniform under-sampling in the second mode of operation.

18. The system of claim 15, wherein the one or more processors are configured to use phase interferometry to identify the angle of arrival for the signal of interest.

19. The system of claim 15, wherein the first and second modes of operation enable reuse of the multiple antennas and the multiple ADCs to support signal detection and direction-finding over a wideband spectrum.

20. The system of claim 15, wherein, in the first mode of operation, the one or more processors are configured to:
use outputs of the multiple ADCs to identify at least one power spectral density for frequencies within a spectrum of interest; and
identify the signal of interest using the at least one power spectral density.

* * * * *